(No Model.) 3 Sheets—Sheet 1.
H. O. THOMAS.
MACHINE FOR BALING TREES.
No. 473,482. Patented Apr. 26, 1892.
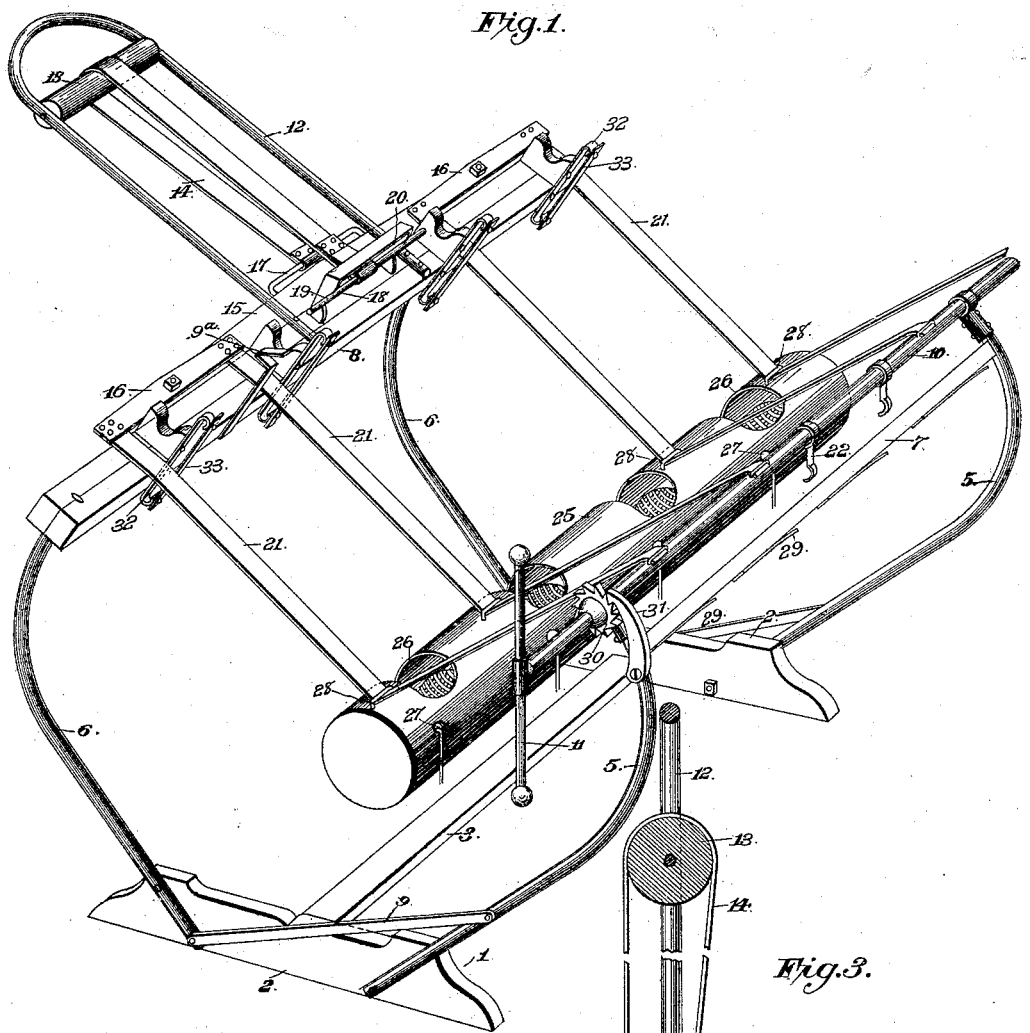
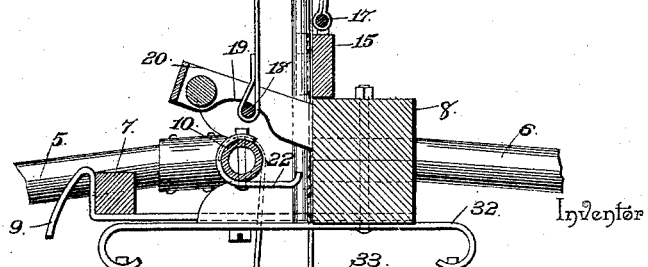
Witnesses
M. Fowler
Wm. Bagger
Inventor
Henry O. Thomas
By his Attorneys,
C. A. Snow & Co.
THE NORRIS PETERS CO., PHOTO-LITHO., WASHINGTON, D. C.

(No Model.) 3 Sheets—Sheet 2.
H. O. THOMAS.
MACHINE FOR BALING TREES.
No. 473,482. Patented Apr. 26, 1892.
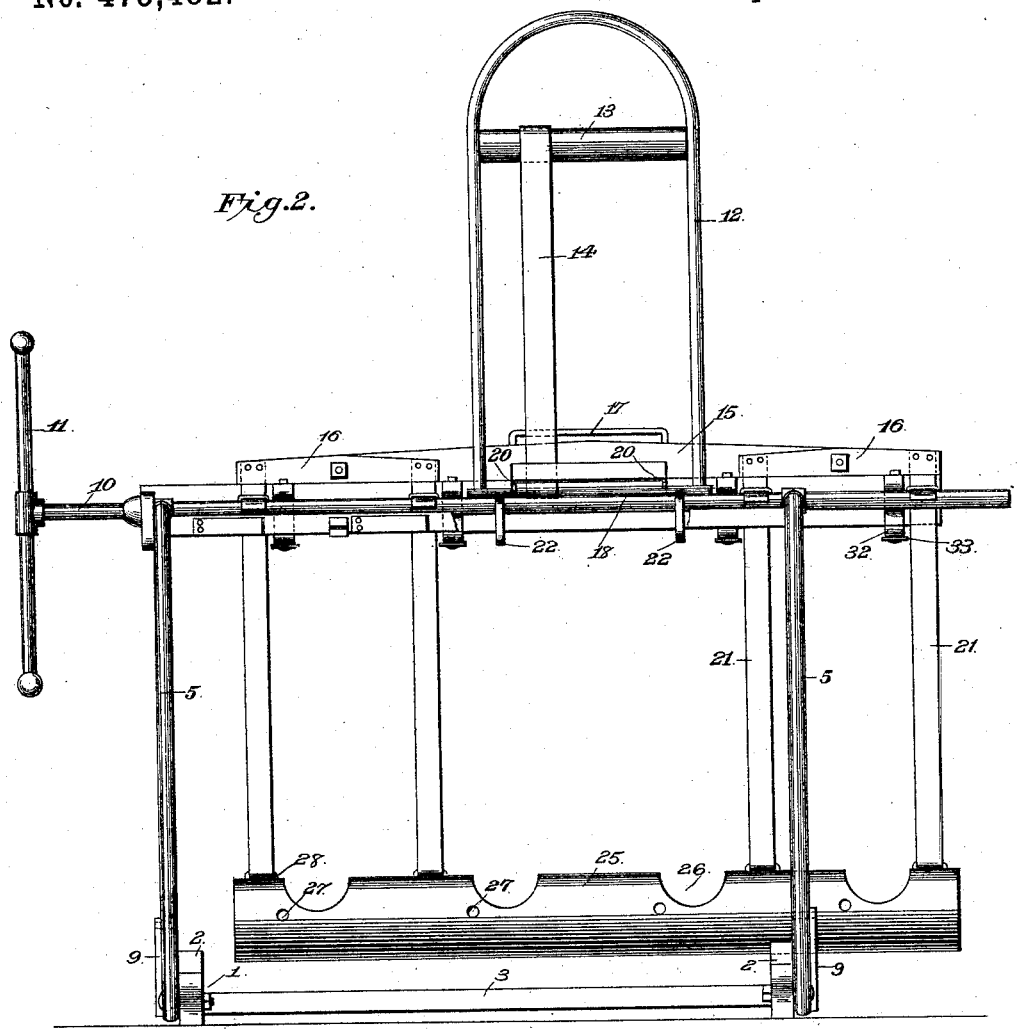
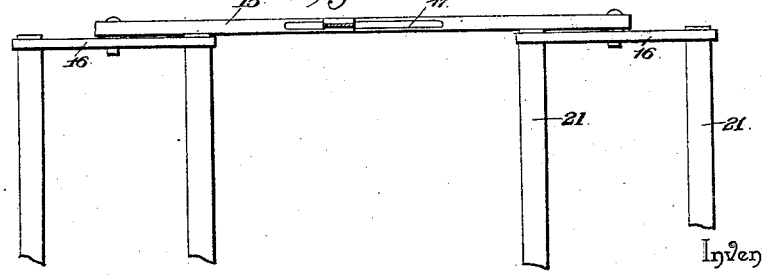
Witnesses
M. Fowler
Wm. Bagger
Inventor
Henry O. Thomas
By his Attorneys,
C. A. Snow & Co.

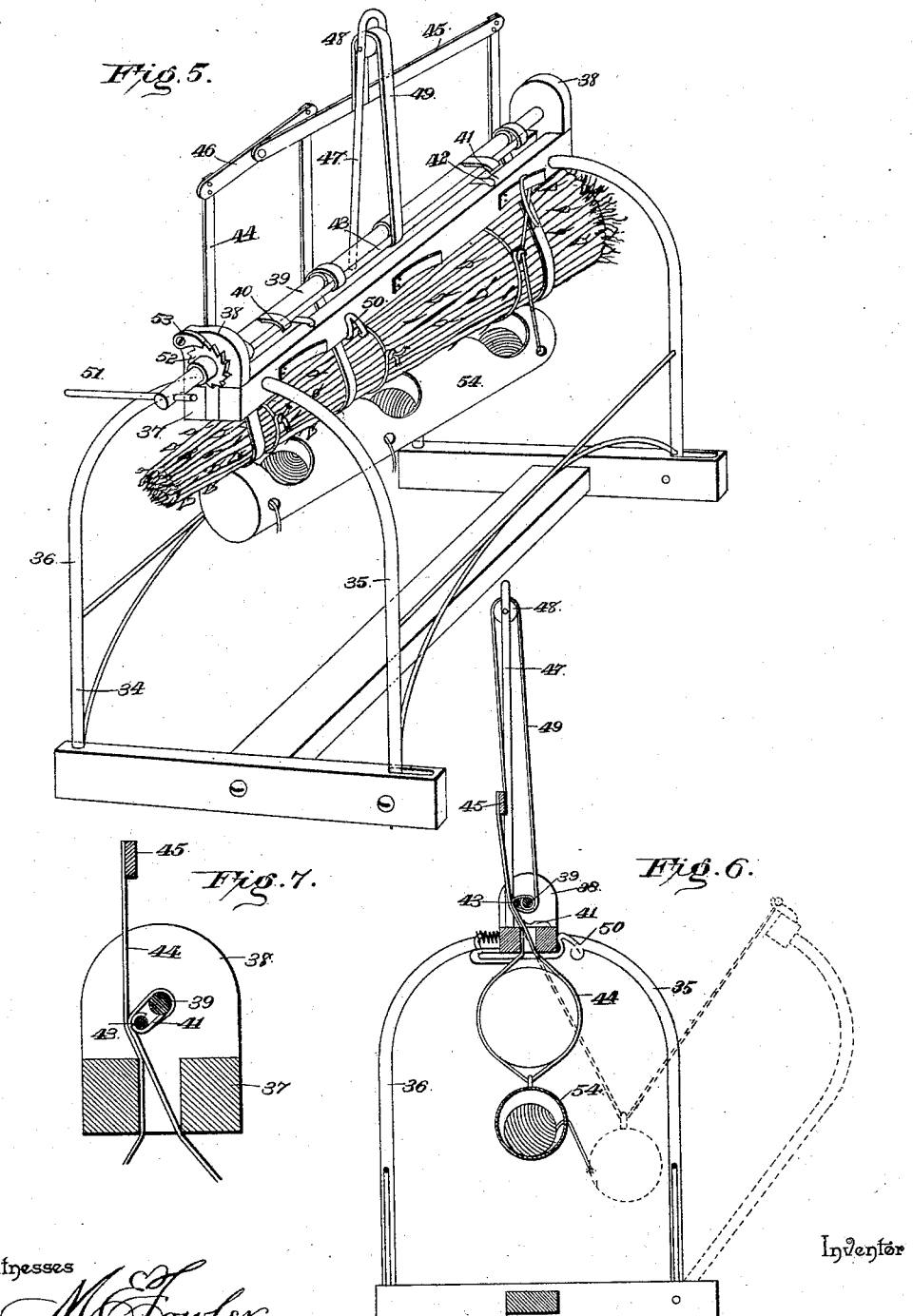

UNITED STATES PATENT OFFICE.

HENRY O. THOMAS, OF NORTH BEND, NEBRASKA, ASSIGNOR OF ONE-HALF TO JOHN W. STEVENSON, OF SAME PLACE.

MACHINE FOR BALING TREES.

SPECIFICATION forming part of Letters Patent No. 473,482, dated April 26, 1892.

Application filed March 4, 1891. Serial No. 383,765. (No model.)

*To all whom it may concern:*

Be it known that I, HENRY O. THOMAS, a citizen of the United States, residing at North Bend, in the county of Dodge and State of Nebraska, have invented a new and useful Machine for Baling Trees, of which the following is a specification.

This invention relates to machines for baling or packing young trees, vines, and the like, such as are frequently sent by nurserymen long distances by freight or express; and it has for its object to provide a machine or apparatus by means of which the young trees may be conveniently formed into bundles of suitable size and held securely while being tied.

The invention consists in the improved construction, arrangement, and combination of parts, which will be hereinafter fully described, and particularly pointed out in the claims.

In the drawings hereto annexed, Figure 1 is a perspective view of a machine constructed in accordance with my invention and showing the pivoted jaws open and the machine in position to receive the trees that are to be packed. Fig. 2 is a side elevation of the same. Fig. 3 is a vertical transverse sectional view. Fig. 4 is a detail top view. Fig. 5 is a perspective view showing a modification. Fig. 6 is a vertical sectional view of the said modification. Fig. 7 is a sectional detail view.

Like numerals of reference indicate like parts in all the figures of the drawings.

The base of the machine, which is designated by 1, is composed of end pieces or sills 2 2, connected by the longitudinal brace 3. The ends of the sills are provided with pivoted curved arms 5 and 6, which are connected in pairs by the saddles 7 and 8, each pair of arms and saddle constituting a pivoted jaw. The arms of the said pivoted jaws are connected by braces 9 above the pivot of one and below that of the other with the base, so that the said jaws may be swung simultaneously in an outward direction. The saddle of one of the jaws is provided with a suitable spring-actuated latch 9ª, adapted to engage the saddle of the opposite jaw, thus operating to hold the said jaws locked together when desired. The arms of one of the jaws are provided with bearings for a shaft 10, which is provided at one end with a crank 11, having a handle, by means of which it may be conveniently manipulated. The saddle 8 of the opposite jaw is provided with an upwardly-extending bail or inverted-U-shaped bracket 12, provided near its upper end with bearings for a drum or reel 13, over which passes a strap 14.

15 designates an evener, which is provided at its ends with pivoted bars 16. Said evener is provided with a staple 17 of considerable length, to which one end of the strap 14 is slidingly attached. The other end of said strap is mounted slidingly upon a long roller 18, which is adapted to be mounted in recesses 19 in the under sides of straps or brackets 20, projecting from the saddle 8. It will thus be seen that the strap 14 may be adjusted or slid along the reel or drum 13, so as to adjust it directly at the center or to either side of the center of the evener 15 and roller 18.

To the ends of the pivoted bars 16 of the evener 15 are attached the ends of straps 21, the opposite ends of which are suitably secured to the shaft 10 of the opposite pivoted jaw. The shaft 10 is provided with hooks 22, adapted to engage the ends of the roller 18.

25 designates a twine-box, which in the present instance consists of an oblong trough or tubular casing made of sheet metal or other suitable material, and provided at its upper side with openings 26, through which the balls of twine may be placed in the said box. The side of the latter is provided with perforations 27 for the passage of the twine. This twine-box may be located in any suitable or convenient position. In the drawings hereto annexed, I have shown it provided on its upper side with staples 28, by means of which it is suspended upon the straps 21, so as to be always in the most convenient position. Suitably mounted upon the other side of the saddle of one of the pivoted jaws is a series of knives or cutters 29, the inner sides of which press against the outer side of the saddle with sufficient tension to retain the ends of the twine which are passed under the said knives or cutters.

In operation the pivoted jaws of the machine are unlatched or separated, while the rod or roller 18, to which one end of the strap 14 is connected, is supported in the recesses 19 of the brackets 20. The free ends of the straps 21 will thus be spread apart, so as to enable the trees, saplings, vines, or the like, to be neatly and conveniently placed thereon. When desired, two bundles may be simultaneously formed at the two ends of the machine, and the strap 14 may be adjusted at or to either side of the center, so as to regulate the pressure, as may be desired. When the desired quantity of trees has been placed in position, the jaws are brought together and secured by means of the latch 9ª. The shaft 10 is then rotated, causing the hooks 22 of the said shaft to engage the rod or roller 18, and to carry the latter out of the recesses 19 in the brackets 20. By continuing the rotation of the shaft 10 the strap 14 will be wound upon said shaft and upon the rod or roller 18, and the ends of the straps 21 will also be wound upon the said shaft 10 until the desired degree of tension upon the bundle or bundles has been attained. The shaft is then retained in position by means of a pawl 30 engaging a ratchet-wheel 31 upon the said shaft until the bundles may be tied. The arrangement of the evener and the pivoted bars 16 enables the machine to adapt itself to the shape of the bundles and to cause proper pressure to be exerted at the various points where the bundles are to be tied.

Suitably attached to the under side of the saddle 8 is a series of springs 32, having their downturned ends connected by straps 33 to form a yielding bearing-surface for the bundles that are being compressed.

My improved tree-baling machine is capable of various modifications, one of which has been illustrated in Figs. 5, 6, and 7 of the drawings. In this case the sills of the machine are provided with one stationary and one pivoted jaw, designated, respectively, by 34 and 35 and each composed of curved arms 36, connected at their upper ends by a saddle. The saddle 37 of the stationary jaw is provided with blocks 38, having bearings for a shaft 39, provided with outwardly-extending hooks 40. The saddle 41 of the pivoted jaw is provided with hooks 42, adapted to support a rod 43, to which are attached the ends of straps 44, the opposite ends of which are attached to the evener 45 and to the ends of the bar 46, pivoted to the latter. 47 designates a bracket extending upwardly from the saddle 37 and having bearings for a reel or drum 48, over which passes a strap 49, the ends of which are attached, respectively, to the evener 45 and to the shaft 39. A latch 50 is provided to lock the saddles together. The shaft 39 has a handle 51 and a ratchet-wheel 52, adapted to engage a pawl 53, and a twine-box 54 is suspended upon the straps 44. The operation of this modification of my invention will be readily understood. When the pivoted jaw is swung in an outward direction, as shown in dotted lines in Fig. 6, the rod 43 may be supported upon the hooks 42, thus enabling the trees to be placed upon the straps 44. When the pivoted jaw is closed and the shaft 39 is rotated, the hooks 40 of the latter will engage the rod 43 and carry the latter off the supporting-hooks 42, thus winding the straps 44 and 49 upon the said shaft and rod and tightening the bundles, which may thus be conveniently tied.

It will be readily understood from the foregoing description that the construction of my improved tree-baling machine may be modified in other particulars than that herein described. Thus, for instance, the evener may be provided with any desired number of pivoted bars, to which the ends of the straps may be attached; and I desire it to be distinctly understood that I reserve to myself the right to any and all changes and modifications which may be resorted to without departing from the spirit of my invention.

Having thus described my invention, what I claim is—

1. In a machine for baling trees, the evener or equalizer and loose straps attached thereto, in combination with the mechanism adjacent said evener for winding the opposite ends of the straps, and supports for said evener and winding mechanism, as and for the purpose set forth.

2. In a machine of the class described, the combination of an evener or equalizer, loose straps attached at one end to the same, mechanism for simultaneously winding the opposite ends of the straps, and supports for said evener and winding mechanism, the latter being located at a point adjacent the normal position of the evener, with means for moving the evener-bar to exert draft on the straps from the ends opposite the winding mechanism, as and for the purpose set forth.

3. In a machine of the class described, the combination, with the winding-shaft and the loose straps having their ends attached thereto, of an evener or equalizer located normally adjacent said shaft, the other ends of the straps being connected to said evener, a strap leading from the evener-bar over a drum, connections between this strap and said shaft, and supports for said shaft and evener, substantially as set forth.

4. A machine for baling trees, having a series of tightening-straps, a suitable evener or equalizer, to which one end of each strap is connected, a winding-shaft for winding the opposite ends of the straps, which are connected thereto, hooks on the shaft, adapted to engage said evener, and means for moving said evener and shaft apart, substantially as set forth.

5. In a machine of the class described, the two jaws composed of curved arms and transverse bars or saddles, the shaft journaled in one of said jaws, the evener or equalizer, a support on the other jaw, a guide-pulley in said support, a strap passing over said guide-pulley and connecting said evener with a rod or roller, means for drawing the roller away from said pulley, and straps having their ends attached, respectively, to the evener and to the revoluble shaft, as and for the purpose set forth.

6. In a machine of the class described, the combination of a revoluble shaft having laterally-extending hooks, an evener or equalizer, the tightening-straps having their ends attached, respectively, to said evener and to the revoluble shaft, a guide-pulley, and a strap passing over said pulley and connecting the evener with a rod adapted to be mounted detachably in the laterally-extending hooks of the revoluble shaft, as and for the purpose set forth.

7. In a machine of the class described, the combination of the pivoted jaws having the saddles and the revoluble shaft journaled in one of the jaws and having laterally-extending hooks, with the brackets extending from the other saddle and having recesses in their under sides, an inverted-U-shaped bracket carried by this saddle, a guide-pulley journaled in said bracket, a strap passing over said guide-pulley and having at one end a rod or roller adapted to fit said recesses, an evener secured to the other end of said strap, and the tightening-straps loosely connecting the said evener or equalizer with the revoluble shaft, substantially as set forth.

8. In a machine for baling trees, the combination, with the pivoted jaws standing normally adjacent and the tightening-straps connecting them, of the spring-actuated straps carried by and at the under side of the saddle of one of the jaws, as and for the purpose set forth.

9. In a machine for baling trees, the combination, with the pivoted jaws standing normally adjacent and the tightening-straps connecting them, of the strips secured to the under side of the saddle of one of the jaws and having downturned ends, and the straps connecting the latter, as and for the purpose set forth.

10. The combination of the arms pivoted to the base, saddles at the upper ends of the arms, and tightening-straps connecting said saddles with the rods pivotally connected to said arms respectively above and below their pivots to the base, as and for the purpose set forth.

11. In a machine of the class described, the combination, with the pivoted jaws, one of which has a revoluble shaft provided with hooks, of a U-shaped bracket carried by the other jaw, a long guide-pulley journaled in said bracket, an evener or equalizer on this jaw, having a long staple, a rod or roller adapted to be engaged by said hooks, a strap having loops in its ends engaging said staple and rod and longitudinally adjustable thereon, with its body between its ends passing over said roller, and connections between said shaft and evener, as and for the purpose set forth.

12. In a machine of the class described, the combination, with the upwardly-rising and inwardly-curved pivoted jaws, of the tightening-straps connecting them and the twine-box supported by said straps between the jaws, substantially as set forth.

13. In a machine of the class described, the combination of a jaw, a pivoted second jaw, the tightening-straps, the twine-box, and the knives or cutters secured to the saddle of the pivoted jaw and bearing against the latter, so as to retain the twine passing under the said knives, substantially as set forth.

14. In a machine of the class described, the combination, with the pivoted jaws, one of which has a revoluble shaft provided with hooks, of a U-shaped bracket carried by the other jaw, a guide-pulley journaled in said bracket, an evener or equalizer on this jaw, having a staple, tightening-straps connecting said evener with the revoluble shaft, a rod or roller adapted to be engaged by said hooks, notched arms projecting from the saddle and normally supporting said rod, a strap, its ends engaging said staple and rod and longitudinally adjustable thereon, with its body between its ends passing over said roller, and the twine-box supported on said tightening-straps, as and for the purpose set forth.

15. In a machine of the class described, the combination, with the pivoted jaws having the saddles and the tightening-straps connecting them and operated as herein described, of the twine-holder consisting of a tubular trough having openings to receive the balls of twine and holes for the passage of the twine strands, and staples in the trough whereby it is suspended upon the tightening-straps, substantially as specified.

16. In a machine of the class described, the combination, with the pivoted jaws, one of which has a revoluble shaft provided with hooks, of a U-shaped bracket carried by the other jaw, a long guide-pulley journaled in said bracket, an evener or equalizer on this jaw having a long staple, tightening-straps connecting said evener with the revoluble shaft, a rod or roller adapted to be engaged by said hooks, notched arms projecting from the saddle and normally supporting said rod, a strap having loops in its ends engaging said staple and rod and longitudinally adjustable thereon, with its body passing over said roller, and a twine-box having staples whereby it is loosely suspended on said tightening-straps, as hereinbefore set forth.

In testimony that I claim the foregoing as my own I have hereto affixed my signature in presence of two witnesses.

HENRY O. THOMAS.

Witnesses:
ANSON W. ATWOOD,
T. F. MARK.